United States Patent
Richards

[19]

[11] Patent Number: 6,036,873
[45] Date of Patent: Mar. 14, 2000

[54] PROCESS FOR GENERATING PRECISION POLISHED NON-PLANNAR ASPHERICAL SURFACES

[75] Inventor: David A. Richards, Rochester, N.Y.

[73] Assignee: Eastman Kodak Company, Rochester, N.Y.

[21] Appl. No.: 08/978,717

[22] Filed: Nov. 26, 1997

[51] Int. Cl.[7] .................................................. B29D 11/00
[52] U.S. Cl. ................................................. 216/24; 216/26
[58] Field of Search ................... 216/88, 89, 24, 216/26, 264; 252/79.1

[56] References Cited

U.S. PATENT DOCUMENTS

| | | | |
|---|---|---|---|
| 4,200,445 | 4/1980 | Bihuniak et al. | 65/18 |
| 4,877,818 | 10/1989 | Emmons et al. | 522/26 |
| 5,116,535 | 5/1992 | Cochrane | 252/313.2 |
| 5,314,789 | 5/1994 | Hawkins et al. | 430/325 |
| 5,347,763 | 9/1994 | Miyamato et al. | 451/241 |
| 5,456,864 | 10/1995 | Wickes et al. | 264/2.5 |
| 5,645,736 | 7/1997 | Allman | 216/89 |
| 5,759,457 | 6/1998 | Inoue et al. | 264/2.5 |
| 5,861,114 | 1/1999 | Roffman et al. | 264/2.5 |

*Primary Examiner*—Bruce Breneman
*Assistant Examiner*—Alva C Powell
*Attorney, Agent, or Firm*—Mark G. Bocchetti

[57] ABSTRACT

A method for precision polishing non-planar, aspherical surfaces in substrates having variations in figure which are within an order of about ten wavelengths (10 λ) is performed by coating the non-planar, aspherical surface with a thin, uniform layer of material, single-point-diamond turning the layer to achieve a layer surface with an excellent surface figure, and etching the layer surface down into the substrate to completely remove the layer thereby transferring the excellent surface figure to the substrate.

20 Claims, 1 Drawing Sheet

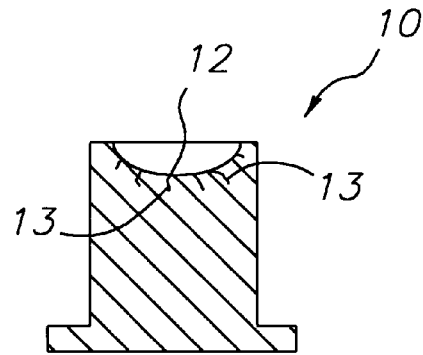 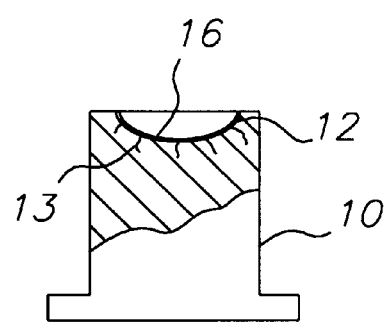
FIG. 1    FIG. 3
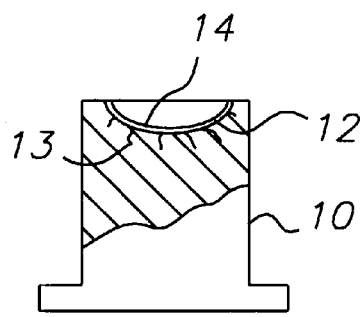 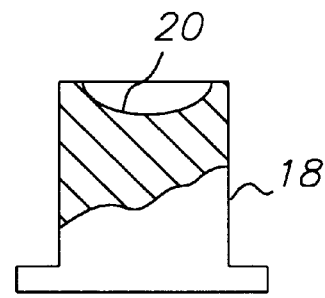
FIG. 2    FIG. 4
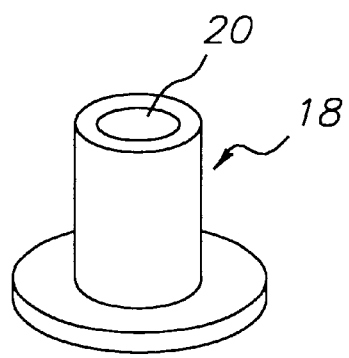
FIG. 5

PROCESS FOR GENERATING PRECISION POLISHED NON-PLANNAR ASPHERICAL SURFACES

FIELD OF THE INVENTION

The present invention relates generally to generating precision polished non-planar, aspherical surfaces and, more particularly, to precision polishing of non-spherical surfaces such as general aspherics, toroids and other anamorphic shapes in mold tooling for molding optical elements therewith.

BACKGROUND OF THE INVENTION

Ceramics such as silicon carbide have been used as the base material from which molding tools are manufactured for molding glass lenses. The production of molding tools from such ceramics requires the ability to polish these materials to very tight figure tolerances and a very high degree of specularity. Polishing these materials is further complicated by the desire to create non-spherical surfaces such as general aspherics (beyond conic sections), toroids and other anamorphic shapes. This is not easily done even in producing tools for molding plastic optics, let alone for producing molds to mold glass optics in high volume. Polishing a surface with a non-reciprocating mechanical device to achieve specularity and surface figure is a very difficult task. Even when such polishing is achieved, it is typically very expensive as the process is very time consuming and requires operation by highly skilled labor. The difficulty is compounded if there is a high volume application such that many of such polished tools are required for operation.

Although the polishing of mold tooling is difficult, the ability to generate challenging surfaces with precision grinding has greatly improved over the years. Interferometric testing on ground surfaces is easily performed. Surface roughness on the order of 50 Å RMS is currently achievable with good figure through operation of computer numerically controlled grinders. These CNC grinders are relatively fast. Thus, it is desirable to polish ground surfaces more quickly than is possible using non-reciprocating mechanical devices of the prior art.

SUMMARY OF THE INVENTION

It is, therefore, an object of the present invention to provide a process for generating precision polished non-planar, aspherical surfaces.

Another object of the present invention to provide a process for generating precision polished mold tool surfaces for molding aspherical optics.

It is a further object of the present invention to provide a process for polishing net shape ground surfaces of mold tooling used for molding aspherical glass optics therewith which can be performed more quickly than conventional non-reciprocating mechanical polishing methods.

Still another object of the present invention is to provide a process for reducing surface roughness of a ground surface having a base surface figure while simultaneously achieving a precision polished surface with an excellent surface figure.

Briefly stated, these and numerous other features, objects and advantages of the present invention will become readily apparent upon a reading of the detailed description, claims and drawings set forth herein. These features, objects and advantages are accomplished by first precision grinding the mold tool substrate to obtain a net shape mold tool having a net shape mold surface therein. The substrate from which the net shape mold tool is made is preferably silicon carbide formed by chemical vapor deposition. Other materials which can be used for the substrate in the fabrication of the net shape mold tool include steel, zirconia, tungsten carbide, Vycor®, glasses, etc. Grinding of the net shape mold surface can be performed with a computer numerically controlled grinder to achieve a surface roughness in the range of from about 50 Å RMS to about 100 Å RMS. A base surface figure must be achieved in that net shape surface with base surface figure being defined as figure wherein variations are within an order of about ten wavelengths (10 $\lambda$). With such base surface figure and surface roughness achieved, a sol gel of some glass composition consistent with the material of the mold tool substrate is coated onto the net shape surface. The coating is partially consolidated to achieve an appropriate level of solidity to allow turning of such surface. Consolidation is accomplished by heating. The appropriate temperature and heating time for partial consolidation are determined empirically. The figure of the pattern turned into the surface must be appropriately calibrated for the subsequent consolidation which is performed after turning. After the surface has been turned to achieve the required excellent surface figure, consolidation of the layer is completed with another heating step. The layer with the turned surface is then etched such as by passive or reactive milling with an ion gun such that the layer with the turned surface is completely etched away to thereby achieve a surface in the substrate of good surface figure and roughness. With a close match of coefficient of thermal expansion of the gel glass and the substrate, an etch may not even be required. It may be possible (with an appropriate coating) to mold glass or plastic optics with the turned, consolidated surface of the gel glass in place.

Alternatively, the method of the present invention can be practiced wherein the coating material an emulsion such as a photoresist. After application of a coating or layer of the emulsion to the ground surface, the net shape mold tool with such layer applied thereto is heated to partially coalesce the emulsion to achieve an appropriate level of solidity which will allow turning. After the surface has been turned to achieve the desired excellent surface figure and roughness, the surface is again heated to more fully coalesce the layer thereby achieving a much greater hardness. The layer is then etched away completely to transfer the excellent surface figure and roughness to the substrate.

BRIEF DESCRIPTION OF THE DRAWINGS

FIG. 1 is a cross-section of a net shape mold tool.

FIG. 2 is a partial cross-section of the net shape mold tool with a coating applied to the net shape mold surface.

FIG. 3 is a partial cross-section of the net shape mold tool with the coating applied thereto with the surface of the coating having been single-point-diamond turned and heated to cause a surface tension smooth surface in the coating.

FIG. 4 is a partial cross-section of the net shape mold tool with a precision polished surface achieved by etching.

FIG. 5 is a perspective view of the net shape mold tool depicted in FIG. 4.

DETAILED DESCRIPTION OF THE INVENTION

Turning first to FIG. 1, there is shown a net shape mold tool 10 having a net shape mold surface 12 formed therein by grinding. The net shape mold tool 10 is preferably formed from silicon carbide formed by chemical vapor deposition. Other materials which can be used as the substrate for the fabrication of net shape mold tool 10 include steel, zirconia, tungsten carbide, Vycor®, glasses, etc. Net shape mold surface 12 is ground to achieve a base surface figure which may be defined as figure wherein variations are within an order of about ten wavelengths (10 $\lambda$). The surface roughness of net shape mold surface 12 can be on the order of about 100 Å and is generally in the range of from about 20 Å RMS to about 100 Å RMS. Grinding can be accomplished with a computer numerically controlled grinding machine. There will likely be several minute cracks 13 emanating from net shape mold surface 12 into the substrate.

As depicted in FIG. 2, a coating 14 is applied to net shape mold surface 12. The material chosen for coating 14 should bond with the material chosen for net shape mold tool 10. The thickness of coating 14 should preferably be in the range of from about one (1) micron to about ten (10) microns. This coating 14 must be applied uniformly. The factors which are relevant to determining coating thickness include the material chosen for coating 14 and the amount of aspheric deviation present. Aspheric deviation is the variation between the figure of net shape mold surface 12 and the desired figure. Preferably, coating 14 is a sol-gel of some glass composition consistent with the material chosen for net shape mold tool 10. Thus, for example, a silica gel can be used for coating 14 with net shape mold tool 10 made from fused silica. The coating 14 is partially consolidated by heating to achieve an appropriate level of hardness or solidity to allow coating 14 to be turned on a lathe. Coating 14 is then turned on a CNC controlled lathe to thereby generate a turned surface 16 on coating 14 as depicted in FIG. 3. The figure of the pattern of turned surface 16 is appropriately calibrated for subsequent consolidation of layer 14. With turned surface 16 thus formed on layer 14, consolidation of layer 14 is then completed by heating thereby transforming turned surface 16 into a consolidated surface with excellent figure and roughness in the range of from about 25 to about 50 Å RMS. Excellent figure may be defined herein as meaning that the surface figure tests to approximately one-quarter wavelength ($\lambda$/4) peak-to valley accuracy. Coating 14 is then etched away preferably by either passive or reactive milling, to thereby transfer consolidated surface 17 down into the substrate of net shape mold tool 10. This results in a mold tool 18 as depicted in FIG. 4 having a mold surface 20 form therein by the etching process. Etching can, of course, be accomplished by a number of methods including ion milling by ion gun, RF sputter etching, or chemical assisted RF sputter etching.

With a match of the coefficients of thermal expansion of the silica gel and the material chosen (for example, fused silica) for the net shape mold tool 10, it may not even be necessary to etch away coating 14. Molding of glass optics could be performed with layer 14 and consolidated surface in place.

As an alternative to sol gel, a photoresist may be used for the formation of coating 14. In particular, it has been found that Eagle 2100 ED photoresist as manufactured by Shipley Company, Inc., of Newton, Mass. can be uniformly applied to ground surface 12. This particular photoresist can be cataphoretically deposited from an aqueous emulsion onto electrically conductive surfaces regardless of shape or geometric complexity. The thickness of such a coating of photoresist should be in the range of from about one (1) micron to about ten (10) or more microns. Once a coating 14 of such photoresist is applied, it is heated, preferably by placing the net shape mold tool 10 with layer 14 thereon in an oven to thereby achieve an appropriate level of solidity or hardness to allow turning. The required temperature and heating time to achieve an appropriate level of solidity (partial consolidation) are determined empirically. Once that level of solidity has been achieved, coating 14 is once again turned to achieve a turned surface 16 with excellent surface figure and a roughness in the range of from about 25 Å to about 50 Å RMS. After turned surface 16 has been achieved, consolidation of layer 14 is completed by baking the net shape mold tool 10 with coating 14 thereon. To prevent over drying the layer 14, the bake temperature should not exceed 250° C. The actual temperature and heating time to achieve full consolidation may again be determined empirically. The literature from Shipley Company, Inc., on Eagle 2100 ED photoresist state that the heating or baking operation causes the deposited emulsion micelles to coalesce. It is believed that heating layer 14 causes cross-linking between the molecular chains of the polymers in the emulsion of layer 14. Layer 14 is then etched away resulting in the transfer of turned, consolidated surface into the substrate of net shape mold tool 10 resulting in mold tool 18 with mold surface 20 formed therein.

With the use of either a sol-gel or a cataphoretically applied emulsion, the net shape ground mold tool has formed therein a highly polished mold surface 20 achieved by etching. The polishing technique of the present invention allows for polishing to be completed in a matter of hours as to the prior art methods of polishing which would generally require about one week to polish the same surface. In addition, multiple tools can be polished simultaneously in a single ion milling machine thus, further enhancing the speed per unit at which mold tool 10 can be polished.

Alternatively, layer 14 can be made from soft metals such as gold which can be electroplated onto the substrate and single-point-diamond turned. The turned surface 16 which has excellent figure can then be etched down into the substrate such that layer 14 is completely removed thereby yielding a mold tool 18 with a precision polished mold surface 20 in the hard substrate. Using soft metals for layer 14 would require that the net shape surface 12 have excellent figure because of the likely disparity between the etch rates of soft metals and the underlying substrate.

It is possible that the process of the present invention can be practiced with other materials being used for layer 14. There may be other materials which can be applied cataphoretically to achieve the desired uniform coating thickness and which can attain the desired hardness. Similarly, there may be polymers which can be uniformly applied to attain the desired coating thickness and hardness. For any sol gel or photoresist selected for layer 14, it is preferred that the etch rate for the selected material closely matches or, at least approximates the etch rate of the substrate. The same would be true for any potential polymer used for layer 14.

From the foregoing it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for generating precision polished non-planar, aspherical surfaces, said method comprising the steps of:
   (a) generating a non-planar, aspheric surface with a base surface figure in a substrate;
   (b) forming a layer on the surface with a material;
   (c) single-point-diamond turning the layer to achieve a layer surface with an excellent surface figure; and
   (d) etching the layer surface down into the substrate to completely remove the layer thereby transferring the excellent surface figure to the substrate.

2. A method as recited in claim 1 wherein:
   the layer is formed with a sol-gel.

3. A method as recited in claim 2 wherein:
   the sol-gel is a silica gel.

4. A method as recited in claim 1 wherein:
   the layer is formed with a photoresist material.

5. A method as recited in claim 1 wherein:
   the layer is formed with a polymeric material.

6. A method as recited in claim 1 wherein:
   the layer is formed with an emulsion.

7. A method as recited in claim 4 wherein:
   the layer is formed cataphoretically.

8. A method as recited in claim 6 wherein:
   the layer is formed cataphoretically.

9. A method as recited in claim 1 further comprising the step of:
   partially consolidating the layer prior to the step of single-point-diamond turning.

10. A method as recited in claim 1 wherein:
    the layer is formed cataphoretically.

11. A method as recited in claim 6 wherein:
    the layer of polymeric material is heated prior to the step of single-point-diamond turning to partially coalesce the layer.

12. A method as recited in claim 2 further comprising the step of:
    partially consolidating the layer of sol-gel prior to said turning step.

13. A method as recited in claim 12 further comprising the step of:
    further consolidating the layer of sol-gel after said turning step.

14. A method as recited in claim 6 further comprising the step of:
    heating the layer after said turning step to more fully coalesce the layer.

15. A method for fabricating molding tools for molding optical surfaces therewith, said method comprising the steps of:
    (a) generating a non-planar, aspheric surface with a base surface figure in a substrate;
    (b) forming a layer on the surface with a material;
    (c) single-point-diamond turning the layer to achieve a layer surface with an excellent surface figure; and
    (d) etching the layer surface down into the substrate to completely remove the layer thereby transferring the excellent surface figure to the substrate.

16. A method for precision polishing a non-planar, aspherical surface with a base surface figure formed in a substrate, said method comprising the steps of:
    (a) forming a layer on the surface with a material;
    (b) single-point-diamond turning the layer to achieve a layer surface with an excellent surface figure; and
    (c) etching the layer surface down into the substrate to completely remove the layer thereby transferring the excellent surface figure to the substrate.

17. A method for fabricating molding tools for molding optical surfaces therewith, said method comprising the steps of:
    (a) generating a non-planar, aspheric surface with a base surface figure in a substrate;
    (b) selecting a material which bonds to the substrate and which has a coefficient of thermal expansion which closely matches a coefficient of thermal expansion of the substrate
    (c) forming a layer on the surface with the selected material;
    (d) single-point-diamond turning the layer to achieve a layer surface with an excellent surface figure; and
    (e) consolidating the layer to achieve a hardness which at least approximates the substrate hardness.

18. A method as recited in claim 1 wherein:
    said layer of said forming, step is formed with a single composition.

19. A method as recited in claim 16 wherein:
    said layer of said forming step is not an abrasive layer.

20. A method as recited in claim 16 wherein:
    said layer of said forming step is formed as a single-point-diamond turnable layer.

* * * * *